Oct. 11, 1966  G. R. P. MARIÉ  3,277,614
PNEUMATIC GIRDERS AND FRAMEWORKS
Filed Sept. 30, 1963  3 Sheets-Sheet 1
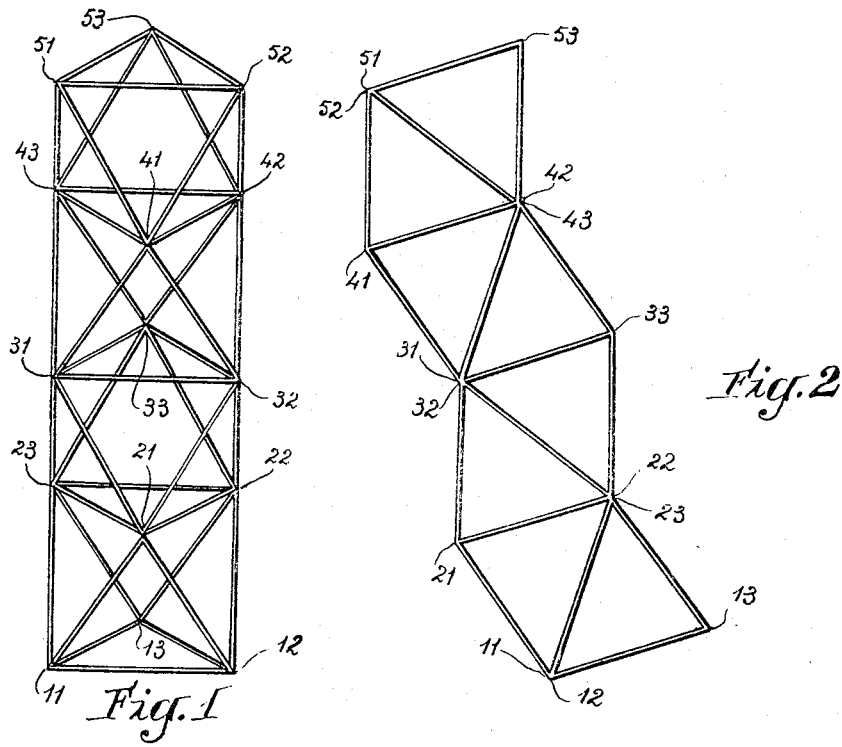
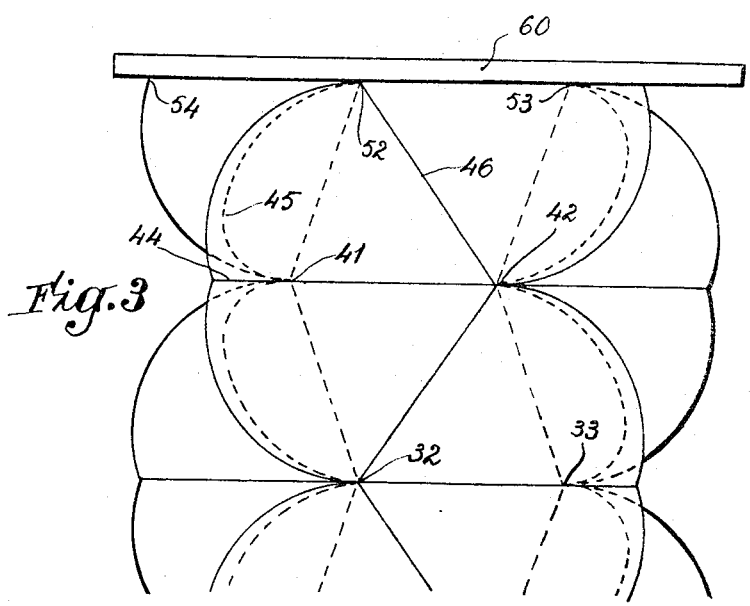
INVENTOR
Georges R. P. Marié
BY
ATTORNEYS Oct. 11, 1966 G. R. P. MARIÉ 3,277,614
PNEUMATIC GIRDERS AND FRAMEWORKS
Filed Sept. 30, 1963 3 Sheets-Sheet 2
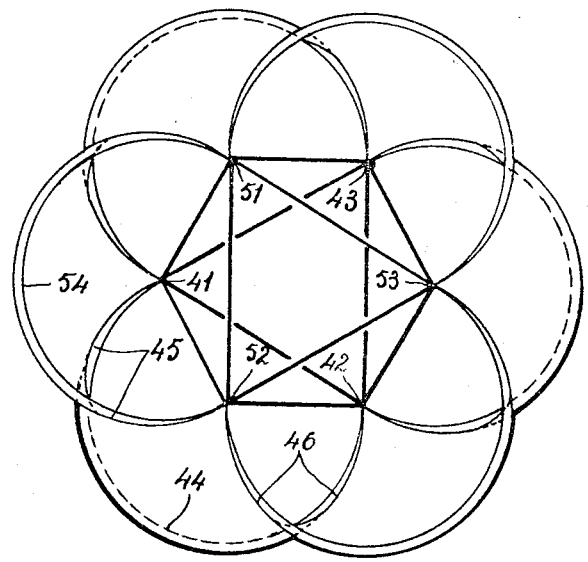
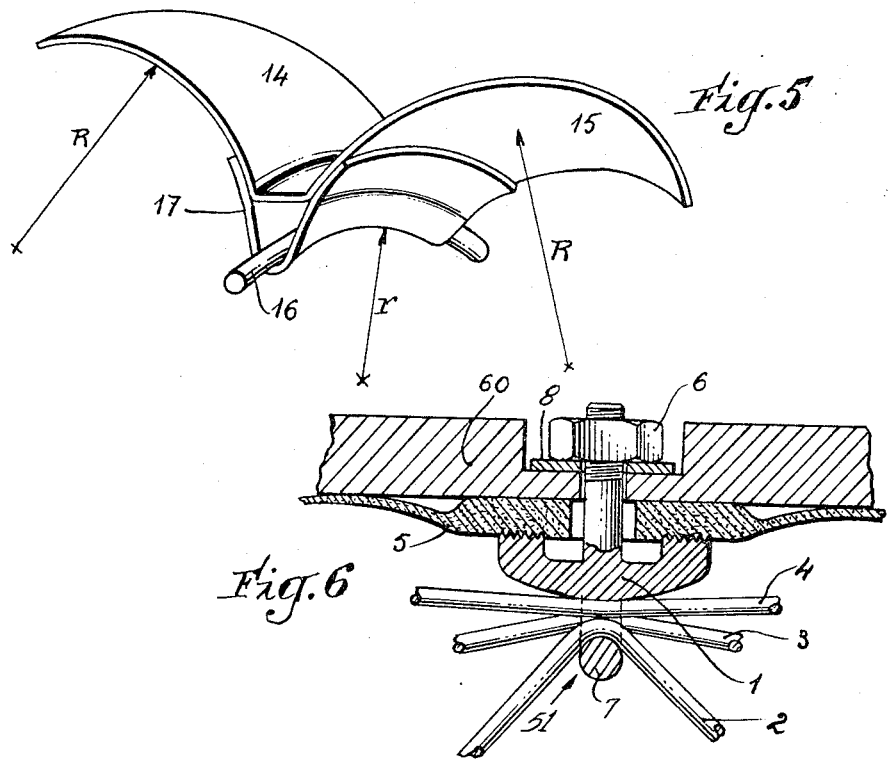
INVENTOR
Georges R. P. Marié
BY Alexander Dowell
ATTORNEYS United States Patent Office 3,277,614
Patented Oct. 11, 1966

3,277,614
PNEUMATIC GIRDERS AND FRAMEWORKS
Georges Robert Pierre Marié, 16 Rue de Varize, Paris, France
Filed Sept. 30, 1963, Ser. No. 312,565
Claims priority, application France, Oct. 8, 1962, 911,516
1 Claim. (Cl. 52—2)

The present invention is relative to a new type of girder or "pneumatic girder" having a high rigidity. Such a pneumatic girder comprises an external flexible cover containing a compressed gas and retained by two different assemblies of cables.

The cables of the first assembly, or prisoner cables, are rigidly secured to the flexible cover along their whole length. The cables of the second assembly, or structural cables, are tensioned between the junction nodes of the preceding assembly. This second cable assembly connects the girder utilization points and it rigidifies the girder as long as the said structural cables are maintained under tension by means of the gas pressure within the flexible cover. External compression stresses are opposed by the said gas pressure.

One object of this invention is to provide a pneumatic girder which may be easily transported under a reduced volume.

Another object of this invention is to provide a pneumatic girder which may be easily erected only by inflating the said flexible cover with a compressed gas.

The structural cable assembly forms a network, the structure of which may be similar to the structure of the irons of a metallic girder of any known type having for example belt elements, braces and longitudinal beams. The prisoner cables are fixed to the nodes of this network onto which they exert a tension due to the compressed gas within the flexible cover.

In a preferred embodiment of the invention, the structural cables of the pneumatic girder are disposed according to the edges of an octahedral structure comprising octahedrons hereunder described as "basic octahedrons." The prisoner cables form geometrical arcs subtended by the structural cables which form the corresponding chords. Said octahedral structure forms a girder having triangular transverse belts.

The prisoner cables permit to distribute uniformly the superficial stresses in the flexible wall or cover to which they are secured.

The said flexible cover consists of spherical portions substantially defined by spherical triangles having their vertices in coincidence with the vertices of the basic octahedrons. The prisoner cables are disposed along the curved edges of said triangular spherical portions.

According to a characteristic of the invention, the triangular end belts of the octahedral structure are reinforced by rigid mechanical devices in or outsidely secured to the flexible cover. These mechanical devices are provided in order to support external stresses, and to distribute them between the three nodes of each end belt.

The general shape of pneumatic girders according to the invention may be adapted to their utilization. These girders may have a straight or arcuate profile, or even form a complete circle. In the case of an arcuate profile, the geometric planes of the triangular belts converge towards the center of curvature of the girder and the sides of the basic octahedrons are no longer parallel.

According to another important characteristic of the invention, the total weight of the structural cable assembly is much less than the weight of a similar traditional girder, since the said structural cables may be made of a special metal, the cast of which would be prohibitive for a traditional girder. This is more especially advantageous when a low girder distortion is required under variable temperatures; in this case, the cables are made of a material having a low modulus of expansion.

According to still another characteristic of the invention, the girder or framework may be inflated with a light gas such as helium or hydrogen when the total structure must have a reduced weight together with large dimensions.

According to a still further characteristic of the invention, the basic octahedrons are connected to each other in one-, two- or three-dimensional assemblies. When such assemblies have to be provided with right angle branches, it is interesting to choose a basic octahedron formed by two pyramids having the same square base and a height half the side of the said basic square.

As hereunder described, it is possible to form the whole structural and prisoner-cable assemblies of a pneumatic girder by means of a sole continuous cable passing three times at each node, the different portions of the said cable being clamped together at the nodes by means of adequate clamping members.

FIG. 1 is a top view showing the structural cable assembly of a straight pneumatic girder.

FIG. 2 is a side view thereof.

FIG. 3 shows one end of a pneumatic girder.

FIG. 4 is a cross-sectional view of a pneumatic girder according to the invention.

FIG. 5 shows a portion of a prisoner cable secured to the flexible cover.

FIG. 6 is a sectional view of a clamping member located at a node of the cable network.

Figure 7:
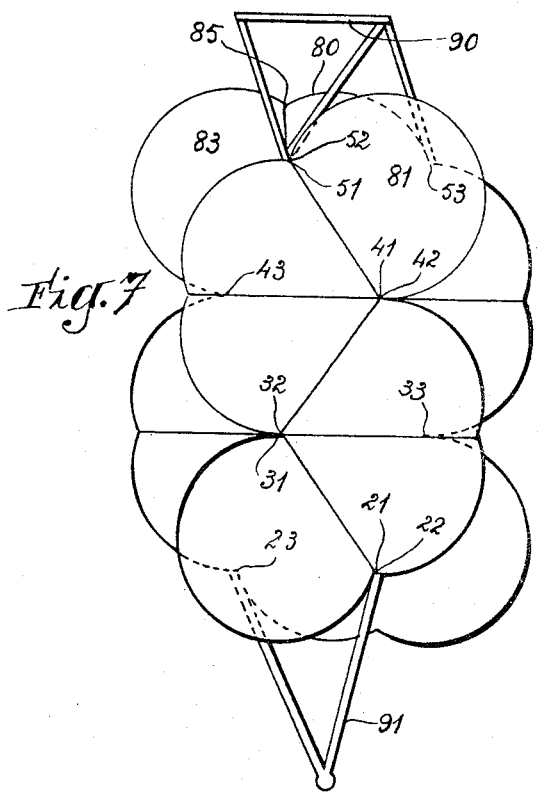
FIG. 7 is a general elevation of a straight pneumatic girder according to the invention.

FIGS. 1 and 2 show the structural cable assembly of a straight pneumatic girder having regular basic octahedrons. FIG. 2 is a projectional view thereof on a symmetry plane. Several nodes 22-23 or 31-32 are thus projected at the same point. FIG. 1 is a projectional view of this structure on a plane parallel to the face 21, 31, 32 of an octahedron. In FIG. 1 are shown the different triangular transverse belts of the girder, for example 11, 12, 13 or 21, 22, 23, which are formed by structural cable portions respectively interconnecting the nodes 11, 12, 13 or 21, 22, 23. Further, the nodes of these two belts are still interconnected by six structural cables having the same relative inclination with respect to the longitudinal axis of the girder. The six nodes of the said two belts and their interconnecting cables form the twelve edges and six vertices of a geometrical octahedron.

In the same manner, the nodes 21, 22, 23, 31, 32, 33 are the six vertices of another octahedron having in common with the preceding one the side 21, 22, 23. The whole girder structure is formed by similar octahedrons stacked upon another. The latter are designated "basic octahedrons," because they perfectly determine the geometry of the pneumatic girder. In practice, this octahedral structure may be considered as a rigid body as long as the structural cables are inextensible and maintained under tension.

FIG. 3 and 4 illustrate how the above skeleton of structural cables is covered by means of a flexible cover. The corresponding elements of FIGS. 1 and 2 on the one hand and FIGS. 3 and 4 on the other hand are referred to by the same reference numerals.

FIG. 3 is a perspective view wherein the relative position of nodes and structural cables corresponds to FIG. 2.

FIG. 4 is a cross-sectional view of the girder on a plane perpendicular to its longitudinal axis and it shows a girder portion comprised between two adjacent transverse belts, i.e, for example the portion comprised between the planes 51, 52, 53 and 41, 42, 43.

Except for the triangular belts, each triangle of the structural cables assembly is covered by a sheet of flexible material having a substantially spherical profile as a result of the inside gas pressure. The said spherical sheet forms a spherical triangle limited by three arcs of circles ending at the nodes of the structural cables assembly. The prisoner cables are disposed along these arcs of circles where the portions of spherical sheets are gas-tightly connected together.

FIG. 5 illustrates a zone of connection between two spherical portions 14–15 and the corresponding prisoner cable 16. R is the radius of the spherical portions and r is the radius of the connecting circle.

The flexible cover is continuous and the prisoner cable 16 is maintained by a strip 17 having its lateral portions welded to the spherical portions 14 and 15 on each side of the said prisoner cable 16.

The strip 17 extends along the whole length of the prisoner cable 16, except at the nodes, in order to permit a free connection of the said prisoner cable 16 at said nodes.

Some of the prisoner cables are located in the planes of the transverse belts such as, for example: the prisoner cable 54 in the plane of the belt 51, 52, 53 (FIG. 4); on the prisoner cable 44 in the plane of the belt 41, 42, 43. In FIG. 4 these prisoner cables 44, 54 are projected according two arcs of circles and the dotted-lined portions indicate that the cables are hidden by the corresponding spherical surfaces of the flexible cover. There are thus three prisoner cables in each belt plane.

Besides, the six structural cables connecting the nodes 41–51–43–53–42–52 of two adjacent belts are doubled by six prisoner cables having a half-circular profile projected in six half-ellipses in FIG. 4. The small axes of the said half-ellipses coincide with the projections of the six corresponding structural cables. One of these elliptical-projecting cables has been designated 45 and the ends of its small axis coincide with the projection of the nodes 41–51. This cable 45 is projected in FIG. 3 according to another ellipse. It is maintained along the connecting line of the two cover spherical portions extending between the nodes 41–52–51 on the one hand and 41–52–42 on the other hand.

Another example is given by the prisoner cable 46, which is located between the two interconnected spherical portions extending between the nodes 42–52–41 and 42–52–53. This prisoner cable 46 is projected along a straight line in FIG. 3.

FIG. 6 illustrates a plate 60 disposed at one end of the pneumatic girder. This plate is secured to the nodes 51–52–53 and it is sufficiently rigid to support the reaction of the cover containing the compressed gas.

By way of example, FIG. 6 illustrates the fixation of the plate 60 to the cables ending at the node 51, by means of a ring 7 integral with a metallic member 1. Three cables are engaged through the ring 7, namely: the structural cable 2 connecting the nodes 41 and 43, the prisoner cable 3 doubling the preceding cable 2, and the prisoner cable 4 ending at the nodes 52–53. The structural cables of the uppermost belt may be suppressed, since the rigid plate 60 defines the distance between the nodes 51–52–53 of the said belt. The flexible cover is provided with a reinforced portion 5 having a central hole through which extends a bolt integral with the metallic member 1.

The metallic member 1 is rigidly secured to the plate 60 by means of a clamping nut 6, and it gas-tightly retains the flexible cover against the plate 60. For reasons of simplicity, 60 represents a plate, but it is apparent that it may be replaced by any other member of more complex shape, adapted to the mechanical connection determined by the conditions of utilization.

Any other assembly similar to the whole unit 51–1–6 (FIG. 6) is referred to as "clamping member."

Each intermediate node such as 31, 32, 33, 41, 42, and so on, is made by passing the three corresponding prisoner- or structural-cables through the ring 7 of such a clamping member. The only difference with FIG. 6 is that the plate 60 has been suppressed, and the washer 8 of the nut 6 urged directly on the flexible cover 5 at each of said intermediate nodes.

FIG. 7 illustrates another embodiment of the girder which comprises three basic octahedrons. The structural cables network corresponds to FIGS. 1 and 2 and it is limited to the portion between the belts 21–22–23 and 51–52–53. As in FIG. 2, the projection has been formed perpendicularly to the symmetry plane.

Between the end belts, the flexible cover corresponds to the preceding description (FIGS. 3 and 4), but the spherical flexible portions extend beyond the planes of said end belts up to planes parallel to the longitudinal girder axis and comprising nodes of the said belt. For example, the spherical portion 83 covering the plane triangle 43–41–42 extends beyond the plane of the belt 51–52–53 up to a circle 85 located in a plane parallel to the longitudinal girder axis and comprising two nodes 51–52 of the said belt 51–52–53. It is apparent that the prisoner cables are secured to the flexible cover along the connecting circles such as 85.

The nodes of the end belts transmit the stresses to a traditional metallic framework (not shown) by means of a connecting assembly, for example comprising the plate 60 (FIG. 6) which is integral with the said external metallic framework. By way of example, the latter may have an octahedral structure, a triangle 90 (FIG. 7) being connected to the vertices 51–52–53 by means of struts forming the edges of an octahedron.

At the other end of the girder may be disposed a framework element or tripod 91 transmitting the stresses to the nodes 21–22–23, above indicated for the triangle 90. The vertex of this tripode may be provided with a ball and socket connexion hinged to the grider carrying members (not shown).

It is important to observe that both the structural and prisoner cable assemblies may be formed by continuous cables passing three times at each node. A simple means to carry out such a realization consists in pulling the cable from one end belt to the other end belt along a helicoidal path, for example, going from 51 to 13 (FIGS. 1–2) through 41–32–22–13; then coming back to the first end belt along a helicoidal path, this time comprising transverse levels which form the belt sides and going from 13 to 53 over 11, 21, 22, 33, 31, 41, 42, 53; and then going on from 53 to 12 over 43, 31, 21; and from 12 to 52 over 13, 23, 21, 32, 33, 43, 41, 52; then from 52 to 11 over 42, 33, 23; and from 11 to 51 over 12, 22, 23, 31, 32, 42, 43, 51; then ending by passing over 52–53 and coming back to the beginning point 51 where the cable is connected to itself.

The nodes 51 (FIG. 6) comprises metallic members 1 through which are bored adequate holes adapted to receive three structural and prisoner cable portions and to orientate them in the desired direction. The said cable portions are clamped in these holes by means of cast white metal, glue, keys, or any other traditional means.

The prisoner cable network has a structure similar to the structural cable network and it may be also formed by means of a sole cable disposed along a path of the above-mentioned kind.

Moreover, this sole prisoner cable may be integral with the cable forming the structural cable network. The nodes metallic units 51–1 are provided with holes adapted to receive the cables forming the prisoner cable network.

Figure 9:
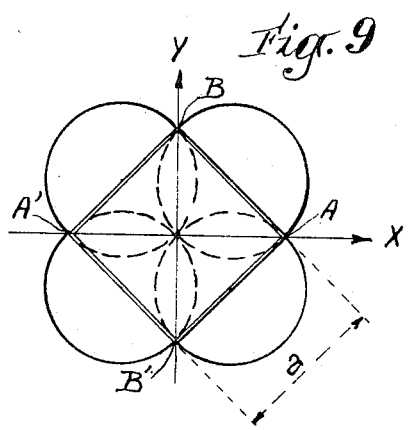
FIG. 9 is a sectional view of one of the basic octahedrons illustrating geometric properties of the structure.

In this case it is important to observe that the three corresponding cable portions are orientated in directions aligned with the belt-structural-cables connected with the nodes (FIG. 9).

In order to realize a complete framework by means of pneumatic girders, it is possible, either to interconnect them by the intermediate of traditional mechanical means, plates or platforms, secured to the end belts (see platform 60, FIG. 3), or to use a multidirectional branching girder element realized in the same manner as the above-described pneumatic girders.

Figure 8:
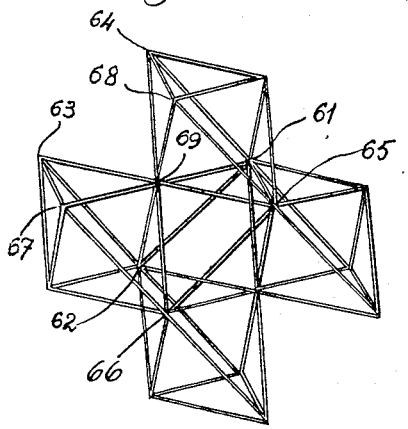
FIG. 8 shows a cable network forming a connecting branch.

FIG. 8 shows the structural cable network of a cross-shaped branching element. The corresponding structural cables are still disposed according to the edges of an octahedral assembly and doubled by prisoner cables which form geometric arcs ending at the nodes and retaining an inflated flexible wall. At each end of the cross-arms is secured a platform in the manner illustrated in FIG. 1 for the plate 60.

It will be observed that, if the cross-arms have to be at right-angle, it is necessary that the structural octahedrons have four right-angled dihedrons. This is realized if each basic octahedron is formed by two square-based regular pyramids disposed on each side of their common square base, the height of the pyramid being equal to half the side of the basic square.

It will be observed in FIG. 8 that the nodes 61, 62, 63, 64, 65, 66, 67, 68 are situated at the vertices of a cube and that the structural cables connecting these vertices to the cube center 69 form the diagonals of the latter.

According to a characteristic of the invention, it is then possible to extend this cubic network, which is rigidified by the diagonals; however, in this case, it is apparent that, in view of tensioning the corresponding cable network, the prisoner cable network does not need to double the structural cables forming diagonals: it is sufficient to double the sides of the squares, the assembly of which limits the volume filled by the cubes. For example, if supposing that the network shown in FIG. 8 extends indefinitely in the plane of the drawings, the flexible cover will comprise an assembly of spherical surfaces, such as the spherical portion 61, 62, 63, 64 which is connected to adjacent spherical surfaces in the four planes perpendicular to the plane of the square 61, 62, 63, 64 and comprising one of its four sides.

According to another characteristic of the invention, the cubic network may be constructively distorted while retaining its topologic structure in order to end in a limit surface having a predetermined shape.

What I claim is:

A pneumatic girder comprising first and second cable assemblies enshrouded by a flexible cover adapted to be inflated, said second cable assembly comprising structural cables connected at their ends to define a series of units shaped as three dimensional polyhedrons having triangular faces, wherein adjacent interconnected units have at least one side in common, the points of connection of the cables forming the units defining nodes, said first cable assembly comprising a network of prisoner cables having portions thereof connected to the nodes of said triangular faces and the remaining portions thereof connected to said flexible cover, where upon inflation, said cover assumes the shape of substantially spherical triangles covering each triangle formed by said structural cables.

References Cited by the Examiner

UNITED STATES PATENTS

| | | | |
|---|---|---|---|
| 2,016,054 | 10/1935 | Sentell | 52—2 X |
| 2,657,716 | 11/1953 | Ford | 52—2 X |
| 2,659,110 | 11/1953 | Carroll | 52—2 |

FOREIGN PATENTS 1,175,912  11/1958  France.

FRANK L. ABBOTT, *Primary Examiner.*

JACOB L. NACKENOFF, *Examiner.*

L. R. RADANOVIC, *Assistant Examiner.*